United States Patent
Stol et al.

(10) Patent No.: US 6,769,595 B2
(45) Date of Patent: Aug. 3, 2004

(54) FRICTION PLUNGE RIVETING

(75) Inventors: Israel Stol, Pittsburgh, PA (US); Wayne M. Thomas, Suffolk (GB); Philip L. Threadgill, Cambridgeshire (GB)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/025,402

(22) Filed: Dec. 19, 2001

(65) Prior Publication Data

US 2002/0125297 A1 Sep. 12, 2002

Related U.S. Application Data

(60) Provisional application No. 60/257,329, filed on Dec. 20, 2000.

(51) Int. Cl.[7] .................. B23K 31/02; B23K 20/12; B23K 37/00

(52) U.S. Cl. .................. 228/112.1; 228/2.1

(58) Field of Search .................. 228/112.1, 2.1, 228/114.5, 2.3

(56) References Cited

U.S. PATENT DOCUMENTS

| | | | |
|---|---|---|---|
| 3,477,115 A | * 11/1969 | Martins | 228/114.5 |
| 3,495,321 A | 2/1970 | Shaff et al. | 29/470.3 |
| 3,853,258 A | 12/1974 | Louw et al. | 228/2 |
| 4,144,110 A | * 3/1979 | Luc | 156/73.5 |
| 4,676,707 A | * 6/1987 | Cearlock et al. | 411/510 |
| 5,153,978 A | 10/1992 | Simmons | 29/509 |
| 5,354,160 A | 10/1994 | Pratt et al. | 411/501 |
| 5,460,317 A | * 10/1995 | Thomas et al. | 228/112.1 |
| 5,718,366 A | 2/1998 | Colligan | 228/112.1 |
| 5,752,305 A | 5/1998 | Cotterill et al. | 29/432.2 |
| 5,769,306 A | * 6/1998 | Colligan | 228/112.1 |
| 5,862,975 A | 1/1999 | Childress | 228/120 |
| 5,971,247 A | 10/1999 | Gentry | 228/2.1 |
| 5,971,252 A | 10/1999 | Rosen et al. | 228/112.1 |
| 5,975,406 A | * 11/1999 | Mahoney et al. | 228/112.1 |
| 6,050,474 A | * 4/2000 | Aota et al. | 228/112.1 |
| 6,067,839 A | * 5/2000 | Xie | 72/391.8 |
| 6,095,395 A | * 8/2000 | Fix, Jr. | 228/2.3 |
| 6,213,379 B1 | * 4/2001 | Takeshita et al. | 228/112.1 |
| 6,227,433 B1 | * 5/2001 | Waldron et al. | 228/112.1 |
| 6,344,117 B2 | * 2/2002 | Enomoto et al. | 204/298.09 |
| 2002/0121319 A1 | * 9/2002 | Chakrabarti et al. | 148/694 |

FOREIGN PATENT DOCUMENTS

| | | | | |
|---|---|---|---|---|
| DE | 19620814 A1 | | 11/1997 | ........... B23K/20/12 |
| DE | 19912460 A1 | | 9/2000 | ........... B21J/15/02 |
| EP | 0337813 A1 | * | 10/1989 | |
| EP | 0337813 A1 | | 10/1989 | ........... F16B/5/08 |
| EP | 627276 | | 12/1994 | ........... B23K/20/12 |
| GB | 1567135 | | 5/1980 | ........... B23P/11/00 |
| GB | 2306366 A | * | 5/1997 | |
| JP | 11-201177 A | * | 7/1999 | |
| JP | 2000-9122 A | * | 1/2000 | |
| WO | WO 99/39861 A1 | * | 8/1999 | |

OTHER PUBLICATIONS

Connect—Apr. 1993, TWI, "On Trial—a New Thick Plate Joining Technique".
Connect—Jun. 1992, TWI, "Leading Edge".
Connect—Sep. 1993, TWI, "Leading Edge—Friction Takes the Plunge".
Connect—Jul./Aug. 1996, TWI, "Thermomechanical Material Processing by Friction".

(List continued on next page.)

Primary Examiner—L. Edmondson
(74) Attorney, Agent, or Firm—Gary P. Topolosky; Julie W. Meder

(57) ABSTRACT

A method of joining a pair of metal components with a rivet having a hardness that is substantially similar to at least one of the metal components. The metal components are stack upon each other and the rivet is rotated and simultaneously plunged in the metal components under pressure to friction weld and metallurgically bond the rivet to the metal components.

11 Claims, 13 Drawing Sheets

OTHER PUBLICATIONS

Connect—Oct. 1997, TWI, "Mechanical Inserts for Surface Enhancement".

BCIRA International Conference 1996, "Emergent Friction Joining Technologies for the Non–ferrous Casting Industry", pp. 30-1—30-12.

Proceedings of the Aluminum 98 Conference, Sep. 23–24, 1998, Essen, Germany, "Friction Based Technology for Aluminium".

Welding for the Process Industries, Apr. 1988, Paper 18, "Solid Phase Cladding by Friction Surfacing", W. M. Thomas (The Welding Institute).

* cited by examiner

FRICTION PLUNGE RIVETING

CROSS REFERENCE TO RELATED APPLICATIONS

This application claims the benefit of U.S. application Ser. No. 60/257,329, filed Dec. 20, 2000 entitled "A Friction Plunge Riveting Process".

BACKGROUND OF THE INVENTION

1. Field of the Invention

The present invention relates to a process for joining or riveting two or more pieces of lapped metal together. The method allows a range of non-ferrous and ferrous metals to be joined, e.g., aluminum, magnesium, copper, titanium, iron, and their respective alloys. More particularly, the invention represents an alternative process for riveting two or more aluminum alloy products together.

2. Prior Art

Conventional solid-phase welding (friction welding) involves rubbing two surfaces together under pressure in relative motion for sufficient time until metal between the two surfaces becomes thermally softened and in a plastic state. As shown in FIG. 1a, friction welding commonly involves rotating a first component A under pressure against a second component B. Alternatively, the component A may be inserted into a bore defined in the component B and rotated to produce a joint within the bore. A more recent development is referred to as "friction plunge welding" which International Patent Classifications B23k 20/12 and B29c 65/06 on "Improvements Relating to Friction Welding", describe as being "a method of operating on a work piece, that method comprising offering a probe of material harder than the work piece material to a continuous or substantially continuous or substantially continuous surface of the work piece; causing relative cyclic movement between the probe and the work piece while urging the probe and the work piece together whereby frictional heat is generated as the probe enters the work piece so as to create a plasticized region in the work piece material around the probe; stopping the relative cyclic movement; and allowing the plasticized material to solidify around the probe." As shown in FIG. 1b, conventional friction plunge welding involves immersing a relatively hard material H into a relatively soft material S with different metal combinations, e.g., steel into aluminum, copper into aluminum, and the like as described in *Connect*, September 1993.

Other mechanisms for joining two or more lapped plates include friction hydro pillar processing (FHPP) and friction taper stud welding (FTSW). Each of FHPP and FTSW are employed with a predrilled hole having a diameter larger than that of the rivet material for FHPP and one using a tapered drill hole for FTSW. These conventional spot-based mechanical fastening processes entail one or more of the following elements: (1) making holes through the parts to be joined as with all riveting processes (pop rivets, self-piercing rivets, "blind" rivets); (2) an absence of metallurgical bonding between the joint parts which makes fastening fully dependent on mechanical locking; and/or (3) a pronounced deformation of the parts being joined (e.g., self-piercing rivets and clinching). Mechanical fastening is also expensive, prone to seepage of environmental elements (salt water, condensation, and the like) and often loosens over time. Loosening of fastened joints may compromise the service performance of the joined components.

Accordingly, a need remains for a method of joining or riveting two or more pieces of lapped metal together wherein the metals may be the same or different and wherein the rivet used to join the metal pieces together is not necessarily different from the metals being joined.

SUMMARY OF THE INVENTION

This need is met by the method of the present invention which was conceived by realizing that it is possible to force-plunge, pierce, penetrate into and metallurgically bond two or more metal parts lapped or stacked together ("stack ups"), by striking a balance between (a) a rivet geometry (i.e., tip shape and diameter and included angle), (b) the strength or hardness of rivets and parts being joined before and during friction welding, (c) the melting temperature range of rivets and the parts to be joined, (d) the respective thicknesses of joined parts, (e) the rate of heat dissipation into the parts and rivets through conduction, and (f) other friction welding parameters including forging and welding force, bum off, revolutions per minute, plunge rate and the like, all which affect heat generation and the forces experienced in a given joining region (i.e., between the rivets and the parts to be joined). While the present invention is particularly suited for joining metal having no predrilled holes or apertures, such holes not being required herein, it is to be understood that the presence of a partially formed hole or a fully formed hole through at least one of the metal parts being so joined may be beneficial in increasing the rate of completion of the method.

The present invention of friction plunge riveting differs from conventional uses of friction plunge welding which require plunging a significantly harder material into a significantly softer material (e.g., copper or steel into aluminum). The friction plunge riveting process of the present invention substantially provides a more homogenous joint region in which the constituent elements of the rivet and the work piece are made from the same metal families. For example, two or more aluminum alloy parts (one or more of which may be substantially pure aluminum) may be joined with an aluminum alloy rivet. There is no requirement for an overlap within the same sub-family of alloys. As one representative example of an interfamily relationship of riveting according to the present invention, components of Aluminum Association Series (AA) 5xxx alloy may be joined with and AA 7xxx alloy rivet. Preferably, however, both the work piece materials and the rivet join a work piece together should have about 50% or greater commonality (or overlap) in the major alloying components. The present invention differs from friction plunge welding in that the probe or rivet used in friction plunge riveting can become partially plasticized as such, friction plunge riveting is particularly suited for applications which require the joining of two or more lapped plates. In such situations, the rivet material may constitute essentially the same or substantially similar material as the work pieces being joined or riveted together. For example, friction plunge riveting of the present invention allows for plunging or piercing aluminum alloy rivets into an aluminum alloy or substantially pure aluminum, copper alloy rivets into parts made of copper alloys or pure copper, magnesium alloy rivets into a magnesium alloy or pure magnesium component parts, titanium alloy rivets into a titanium alloy or pure titanium parts, or steel rivets into steel parts.

In contrast to the conventional spot-based mechanical fastening, friction plunge riveting according to the present invention relies on a metallurgical bond formed between the rivet and the parts being joined. The riveting process of the present invention thus a) eliminates the need to machine a hole in the parts being joined, b) effects a full metallurgical bond between the rivet and the parts being joined, and c) minimizes deformation of the parts and/or the rivet unless the deformation is designed for aesthetic reasons.

A complete understanding of the invention will be obtained from the following description when taken in connection with the accompanying drawing figures wherein like reference characters identify like parts throughout.

DESCRIPTION OF THE PREFERRED EMBODIMENTS

Figure 1A:
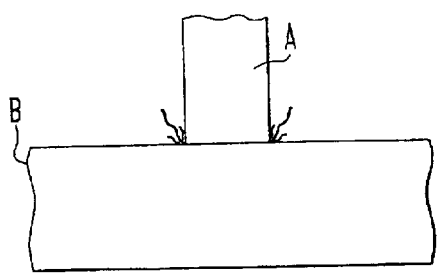
FIG. 1a is schematic of friction welding according to the prior art.
Figure 1B:
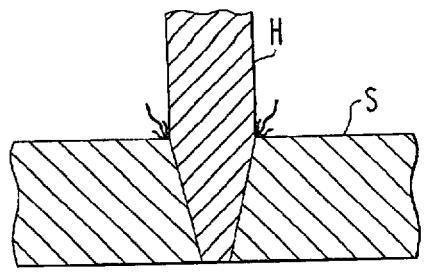
FIG. 1b is schematic of friction plunge welding according to the prior art.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2A:
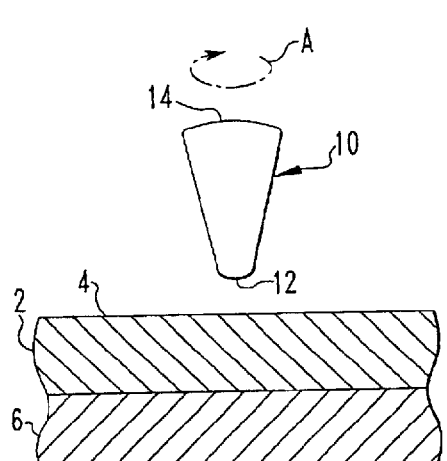
FIGS. 2a–2c are cross-sectional views of a pair of metal work pieces undergoing friction plunge riveting according to the present invention.

Referring to FIG. 2a, the method of the present invention includes stacking a first metal component 2 having an exposed, continuous surface 4 (without a hole predrilled therethrough) against a second metal component 6 having an exposed surface 8. The compositions of the first and second metal components 2 and 4 may be the same or different. A metal rivet 10 having a leading tip 12 and a head 14 is rotated about its longitudinal axis in the direction of arrow A. The rivet 10 is composed of the same or different composition as either or both of the first and second metal components 2 and 6.

Figure 2B:
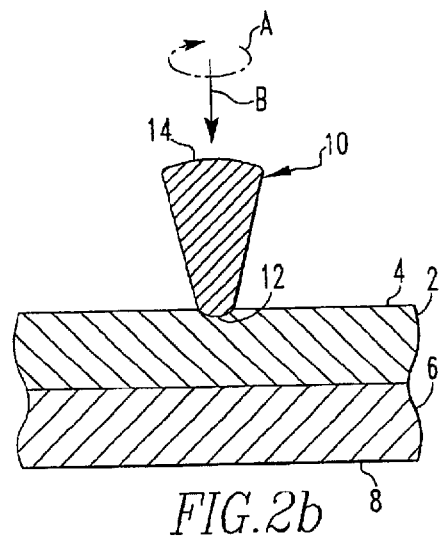
Figure 2C:
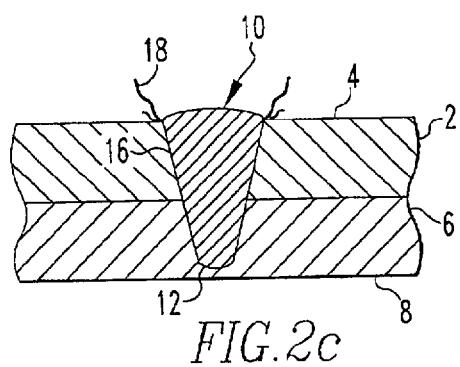

As shown in FIG. 2b, the tip 12 of the rivet 10 is urged under pressure into the metal of the first component 2 in the direction of arrow B. The process continues until the rivet 10 extends at least part way into the thickness of the second component 6 as shown in FIG. 2c. The friction between the rivet 10 and the first and second components 6 causes the metals thereof to plasticize. The rotation is ceased, and the plasticized metal solidifies to form a joint 16 between the rivet 10 and each of the first component 2 and the second component 6. The friction welding between the rivet 10 and the first component 2 and between the rivet 10 and the second component 6 causes the formation of flash 18 which escapes from the region of the joint 16 and collects adjacent the first component exposed surface 4. The flash 18 shown in FIG. 2c is generally produced in all the embodiments described herein, however for simplicity, it may not be shown in all the drawings. The joint 16 is a metallurgical bond between the metal of the rivet 10 and each of the metals of the first and second components 2 and 6.

Figure 3A:
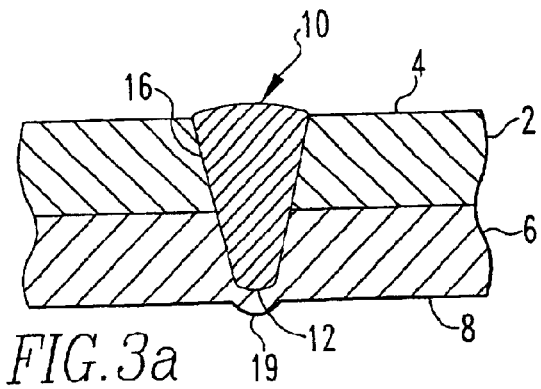
FIG. 3a is a cross-section view of a friction plunge riveted joint made in accordance with the present invention, wherein the rivet creates a raised portion in one of the work pieces.
Figure 3B:
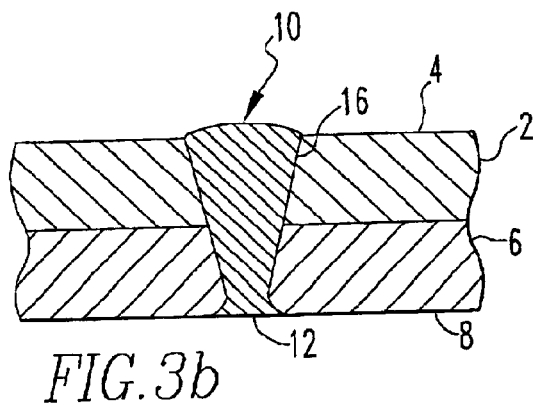
FIG. 3b is a cross-section view of a friction plunge riveted joint made in accordance with the present invention, wherein the tip of the rivet is flush with the exposed surface of one of the work pieces.
Figure 3C:
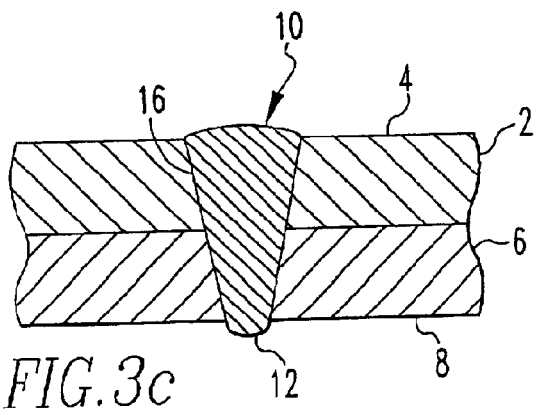
FIG. 3c is a cross-section view of a friction plunge riveted joint made in accordance with the present invention, wherein the rivet extends through both of the work pieces.

In the embodiment shown in FIG. 2c, the final location of tip 12 of the rivet 10 is within the second component 6 such that the exposed surface 8 of the second component 6 remains unchanged. FIGS. 3a, 3b, and 3c show alternative final positions for the rivet tip 12 in the friction plunge riveting process of the present invention. As shown in FIG. 3a, the rivet 10 may extend so far into the second component 6 that the tip 12 creates a raised portion 19 on the exposed surface 8 of the second component 6. In FIG. 3b, the rivet 10 fully penetrates the second component 6 (and is fully bonded thereto) but the rivet tip 12 remains flush with the exposed surface 8 of the second component 6. The rivet 12 may spread along the exposed surface 8 as shown in FIG. 3b. Use of a rivet tip 12 flush with the exposed surface 8 avoids the additional drag resistance associated with conventional rivets used on the exterior of transportation vehicles, such as airplanes and truck bodies. A particular advantage of the use of the present invention in constructing aircraft skin is that the flush joints produced hereby reduce or eliminate the shredding of skin in an airplane crash. Alternatively, as shown in FIG. 3c, the rivet tip 12 may extend through the exposed surface 8. In this manner, the rivet tip 12 may have the appearance of a conventional rivet head.

Figure 4A:
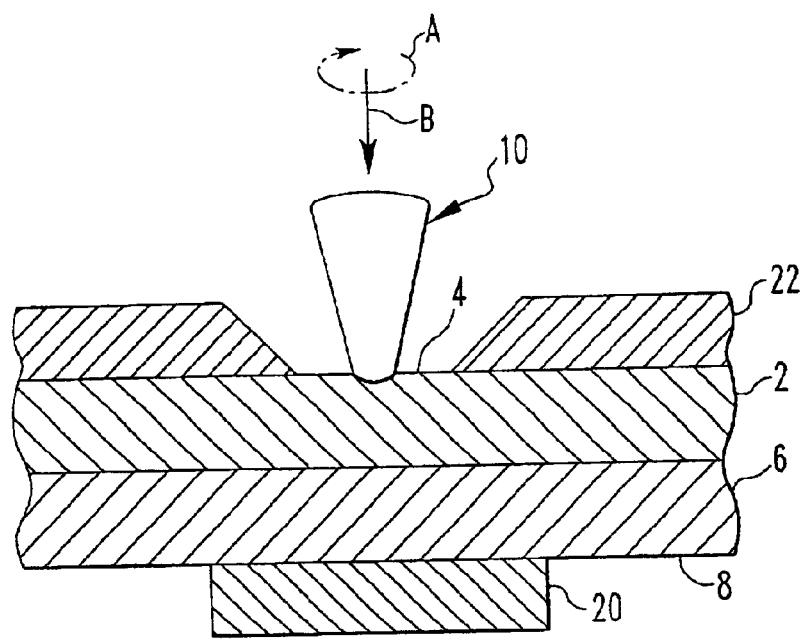
FIG. 4a is a cross-sectional view of a pair of metal work pieces undergoing friction plunge riveting according to the present invention using a clamp and a backing anvil to hold the work pieces in place.
Figure 4B:
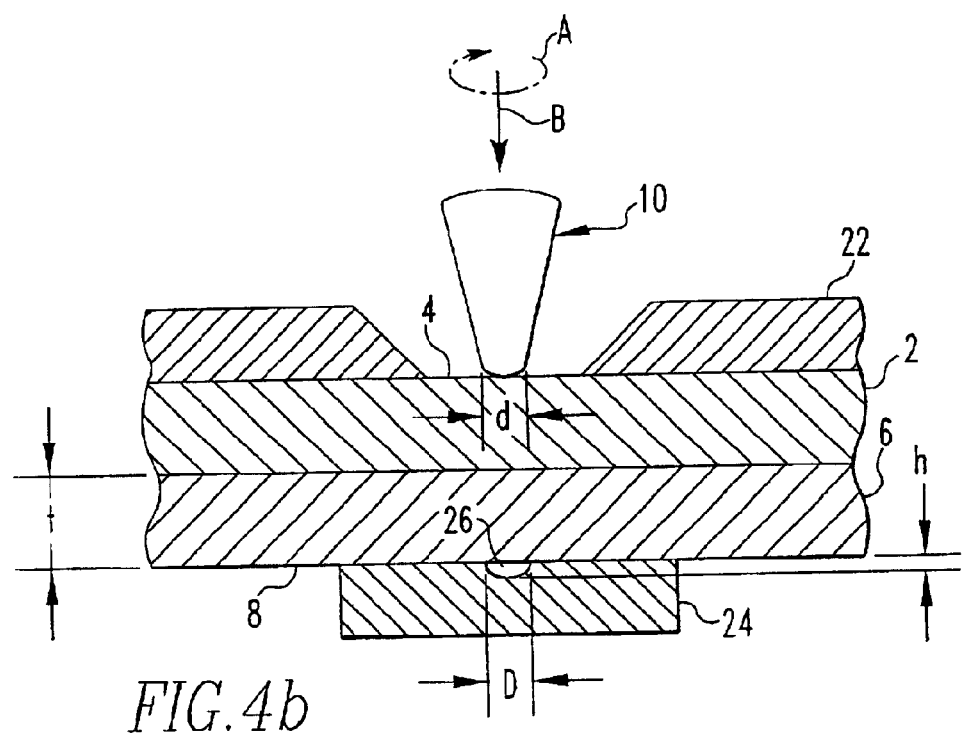
FIG. 4b is a cross-sectional view of a pair of metal work pieces undergoing friction plunge riveting according to the present invention using a clamp and a backing anvil to hold the work pieces in place, wherein the anvil defines a rivet tip receiving recess.

The friction plunge riveting process of the present invention preferably is performed by maintaining close contact between the first and second components 2 and 6. This may be accomplished by clamping the components 2 and 6 between a backing anvil 20 and a clamp 22 as shown in FIG. 4a. The backing anvil 20 shown in FIG. 4a is suitable for production for the joint shown in FIG. 2c and FIG. 3b in which the rivet tip 12 remains within the thickness of the second component 6 or is flush with the exposed surface 8 of the second component 6. For the joint shown in FIG. 3b, the backing anvil 20 provides a stop that prevents advance of the rivet 12 beyond the plane of the exposed surface 8. As shown in FIG. 4b, when producing the joints shown in FIGS. 3a and 3c, it is preferred to use a backing anvil 24 that defines a recess 26. The recess 26 is sized and configured to accommodate the raised portion 19 of the second component 6 as shown in FIG. 3a or the rivet tip 12 as shown in FIG. 3c. In order to avoid uncontrolled separation between the rivet 12 and the first and second components 2 and 6 due to expulsion of plasticized metal, the recess 26 preferably is hemispherical and has a diameter D equal to or preferably less than a diameter d of the rivet tip 12. A hemispherical recess 26 causes the rivet tip 12 to take on a hemispherical shape when riveting according to FIG. 3c. In addition, a height h of the recess should not exceed about one half of the thickness t of the second component 6. Alternatively, in situations where the rivet 10 has a relatively constant diameter along its length, the diameter D of the recess 26 is substantially equal to the rivet diameter d. The anvil 24 preferably is made of a strong or hard material that can completely withstand the force and thermal shock associated with forming the rivet 12 of FIG. 3c. Representative materials include steel alloys (e.g., tool steel) or ceramic materials (e.g., alumina). Other configurations for the recess 26 may be used to create other shapes for the rivet tip 12 that extends through the exposed surface 6. Alternative configurations include hexagonal, round, flat, and hexagonal with a center recess, either hexagonal or slotted. Raised portions 19 having such alternative shapes can be produced by plunging the rivet 10 fully through the second component 6 and deforming the rivet 10 in its plasticized state into the recess 26 having the desired shape.

Figure 5:
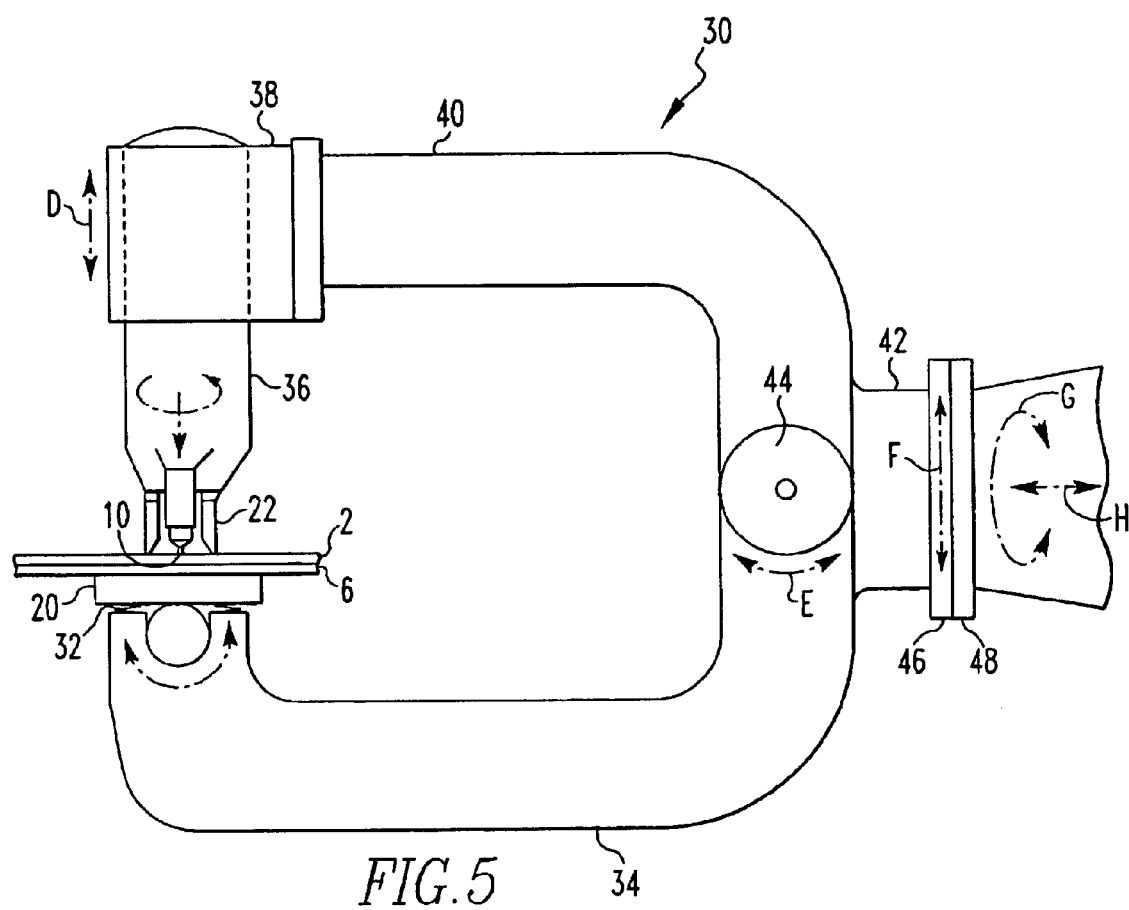
FIG. 5 is a schematic of a friction plunge riveting apparatus for practicing the method of the present invention.

The backing anvil 20 or 24 and clamp 22 shown in FIGS. 4a and 4b may be constituents of a friction plunge riveting system 30 schematically shown in FIG. 5. The backing anvil 20 or 24 is supported by a resilient mechanism; such as a spring 32 (or a pneumatically loaded system or the like) mounted on a lower leg 34 for urging the backing anvil 20 or 26 towards the clamp 22. The rivet 10 is held and driven by an upper spindle 36 movably supported by a sleeve 38 fixed to an upper leg 40. The upper spindle 36 is moveable through the sleeve 38 in the directions of double arrow D to compensate for varying thicknesses of the first and second component 2 and 6. The lower leg 34 and upper leg 40 are mounted to a main support 42 via a connecting axle 44. The orientations of the lower leg 34 and upper leg 40 may be altered by rotating the connecting axle 44 in the directions of double arrow E. A pair of relatively slidable plates 46 and 48 is fixed to the main support 42 and a beam 50. The main support 42 may be raised or lowered by sliding the plate 46 relative to the plate 48 in the directions of double arrow F. The position of the system 30 may be adjusted by rotating the beam 50 in the directions of double arrow G or moving the beam 50 in the directions of double arrow H or both.

Figure 6A:
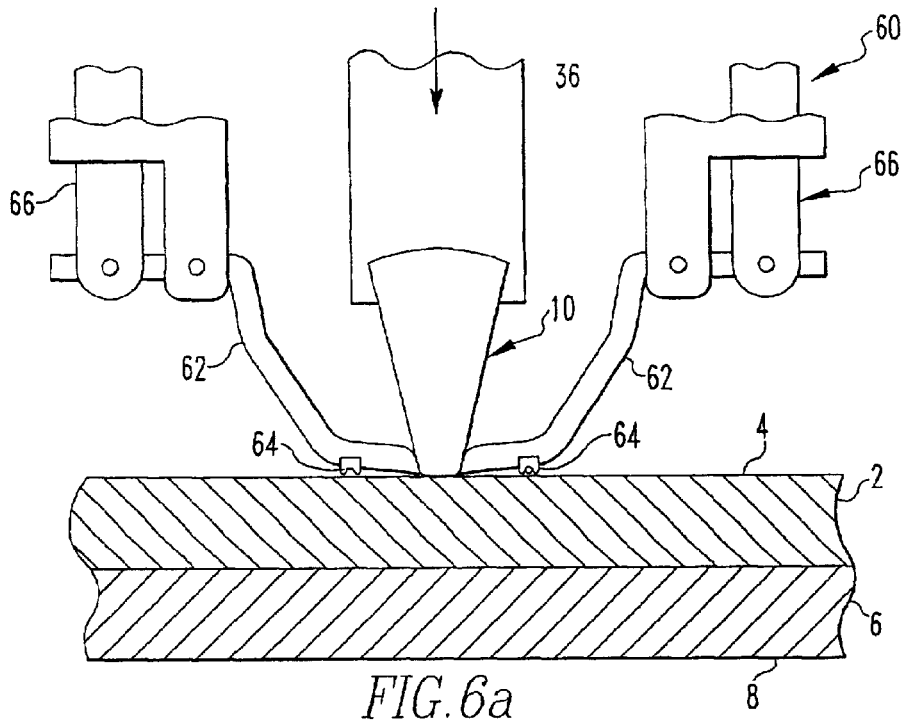
FIGS. 6a–6c are schematics of a pair of metal work pieces undergoing friction plunge riveting according to the present invention using a scraper system to remove flash.
Figure 6B:
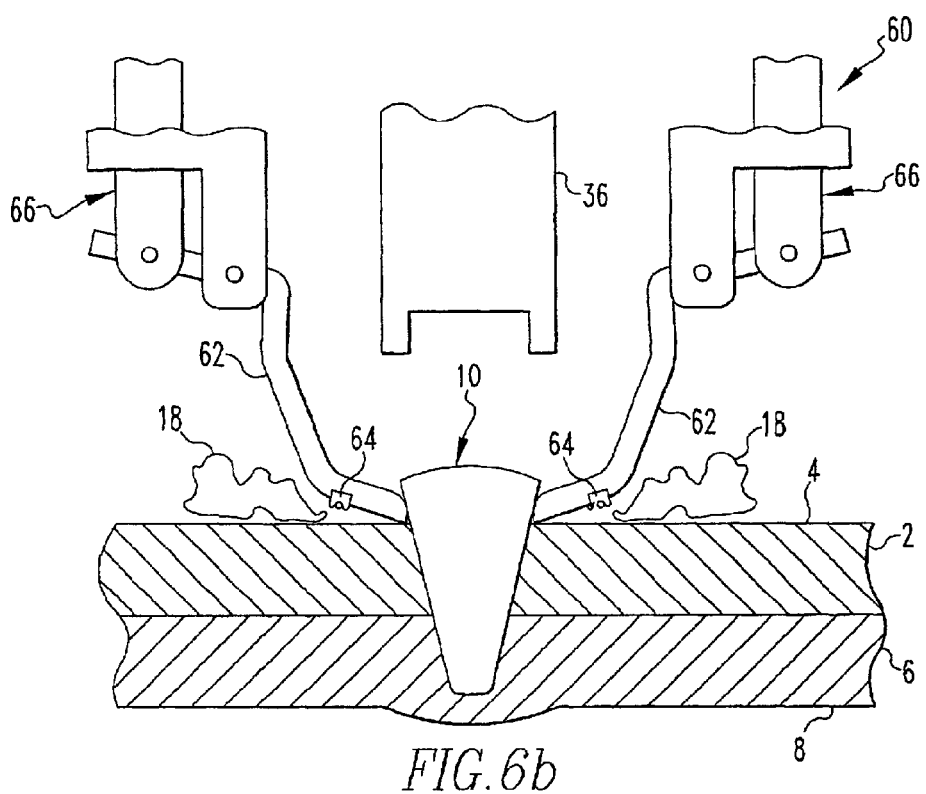
Figure 6C:
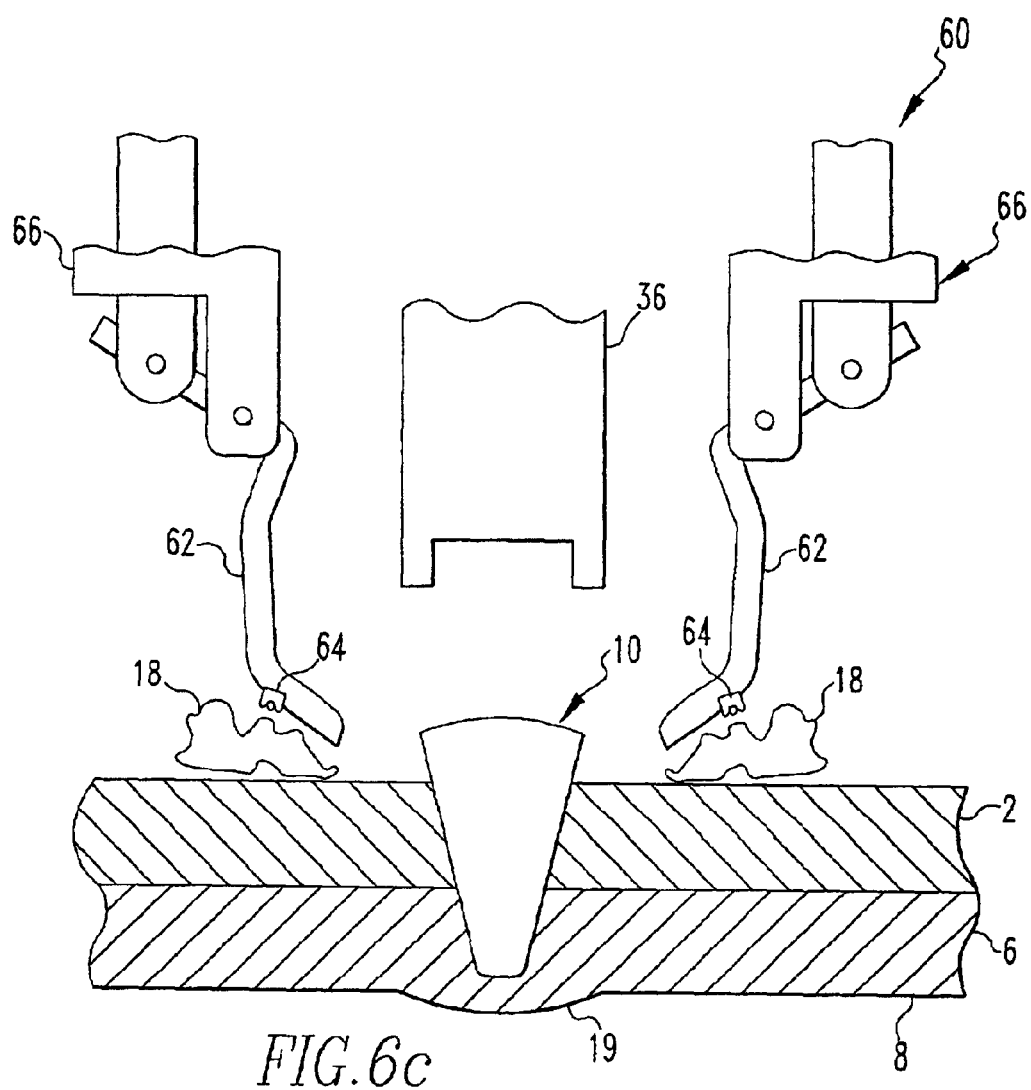

As shown in FIG. 2c, flash 18 may be produced, particularly on the exposed surface 4 of the first component 2. The flash 18 may be removed by a scraper system 60 schematically shown in FIGS. 6a–6c. Referring to FIG. 6a, the scraper system may include flash removing scrapers 62 that also serve to align the rivet 10 in the location that the joint is to occur. Standoff bearings 64 support the flash removing scrapers 62 in position adjacent the first component 2. The flash removing scrapers 62 are releasably engaged via linking components 66 to the spindle 36. As the spindle 36 rotates and plunges the rivet 10 into the first and second components 2 and 6, the flash removing scrapers 62 are rotated in a synchronized manner with the spindle 36. Flash 18 is produced as shown in FIG. 6b and collects between the flash removing scrapers 62 and the exposed surface 4 of the first component 2. Referring to FIG. 6c, when riveting is complete, the flash removing scrapers 62 are disengaged from the spindle 36 and are moved away from the rivet 10 while continuing to rotate thereby knocking the flash 18 away from the location of the joint. The flash 18 may additionally be blown away with a burst of compressed air or the like.

Figure 7A:
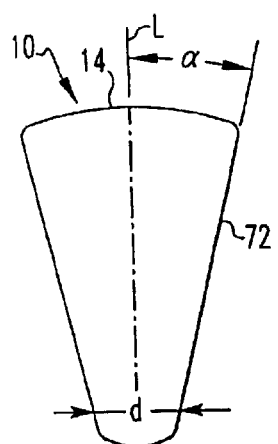
FIGS. 7a–7i show various embodiments of the rivets of the present invention.
Figure 7B:
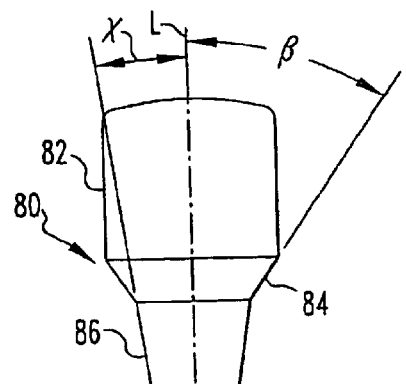
Figure 7C:
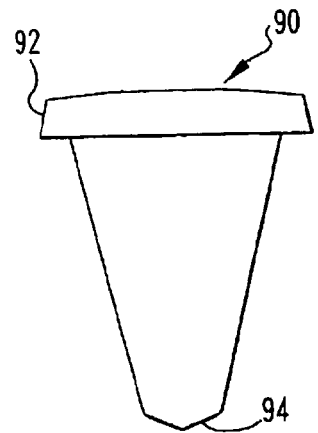
Figure 7D:
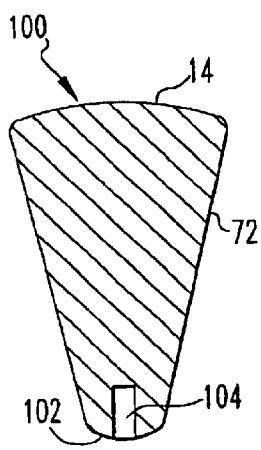
Figure 7E:
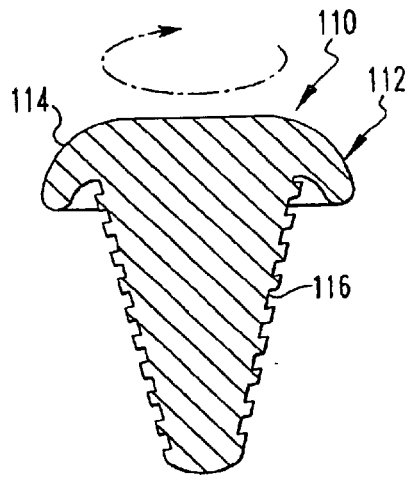
Figure 7F:
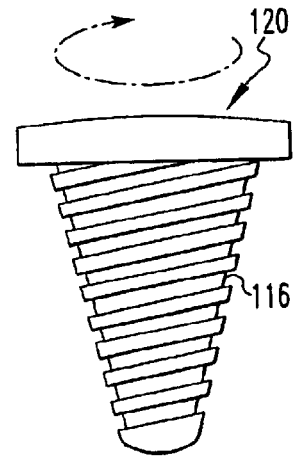
Figure 7G:
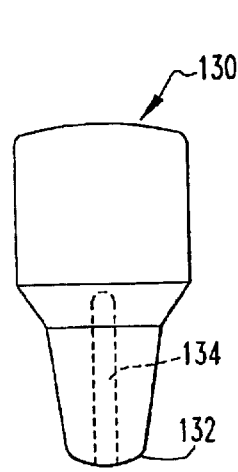
Figure 7H:
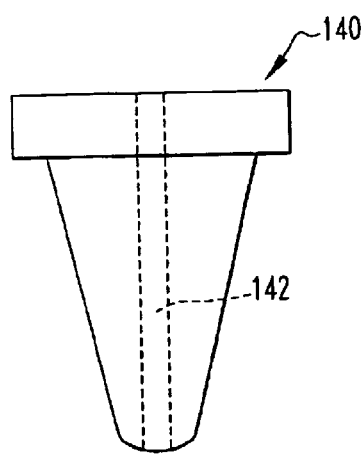
Figure 7I:
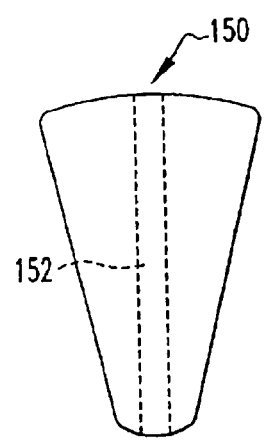
Figure 8:
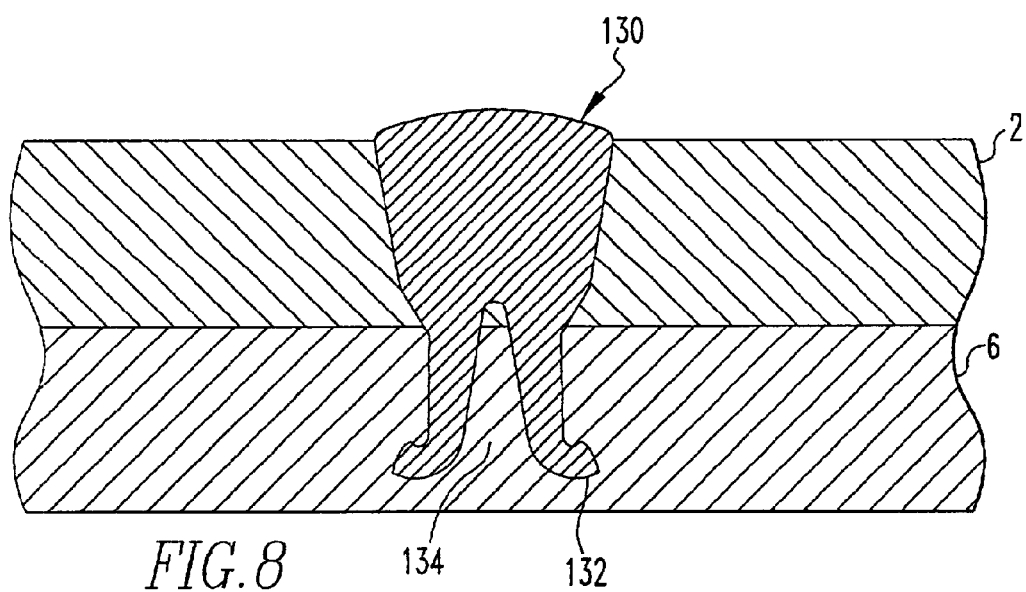
FIG. 8 is a cross-sectional view of a pair of metal work pieces undergoing friction plunge riveting using the rivet shown in FIG. 7g.

The rivet 10 shown in FIG. 10 is shown in detail in FIG. 7a. Rivet 10 includes slanted sides 72 which make an angle α with the centerline L of the rivet 10, with α being up to about 35°, preferably about 7° to about 25°. One suitable diameter d of tip 12 of the rivet 10 is about 10 mm. Rivet 10 is shown as having a rounded tip, but the tip may also be planar. Other non-limiting examples of rivets are shown in FIGS. 7b–7i. Rivet 80 shown in FIG. 7b includes a cylindrical portion 82 that steps down to a first slanted side 84 which makes an angle β with the centerline L of the rivet 80 and to a second slanted side 86 which forms an angle γ with the centerline L of the rivet 80, with β being greater than angle γ. As shown in FIG. 7c, rivet 90 includes an integral flange 92 and has a pointed tip 94. Rivet 100 shown in FIG. 7d is similar to rivet 10 except that rivet 100 has a tip 102 which defines a central opening 104. Another variation of rivet 10 is shown in FIG. 7e as rivet 110 which includes an integral flange 112 having sloping sides 114 and one or more helical groove(s) 116 defined in the surface. The helical grooves 116 assist in threading the rivet 110 into a work piece and act similar to a friction stir welding tool. Rivet 120 shown in FIG. 7f is similar to rivet 110 except that integral flange 22 has straight sides 124. A partially hollow rivet 130 (similar to rivet 80) with a tip 132 defining a cavity 134 is shown in FIG. 7g. Rivet 130 displaces less material and requires less axial force to plunge into work pieces. Alternatively, as shown in FIGS. 7h and 7i, rivets 140 and 150 define respective bores 142 and 152 through the lengths thereof. Rivets having holes, cavities or bores typically deform during the friction plunge welding process yet may hide flash produced during riveting. For example, referring to FIG. 8, the tip 132 of the rivet 130 may deform such that the tip 132 is forced back in the opposite direction to the riveting direction and the cavity 134 widens to provide a mechanical lock in addition to the metallurgical bond produced during the riveting process.

Figure 9A:
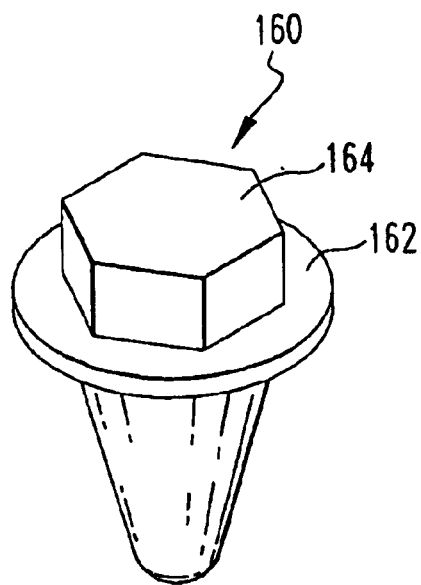
FIGS. 9a–9d are perspective views of other rivets of the present invention.
Figure 9B:
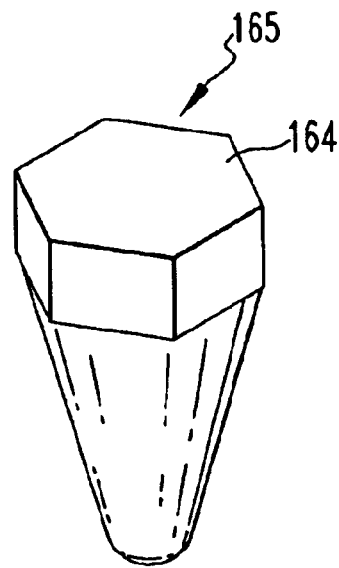
Figure 9C:
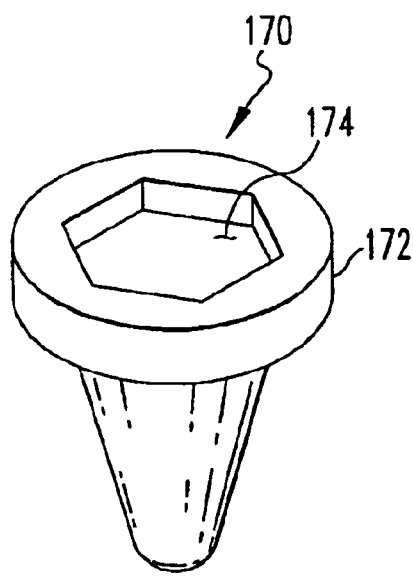
Figure 9D:
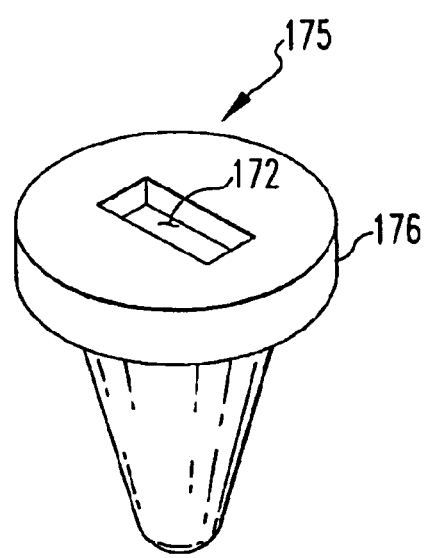

The rivets shown in FIGS. 9a, 9b, 9c, and 9d are configured to allow for enhanced engagement with the system 30 for rotating rivet and plunging rivets into work pieces. Rivet 160 shown in FIG. 9a includes an integral flange 162 and a hexagonal head 164. Referring to FIG. 9b, rivet 165 includes the hexagonal head 164. Rivet 170 of FIG. 9c includes an integral flange 172 which defines a hexagonal recess 174, and rivet 175 of FIG. 9d includes integral flange 176 having a top slotted recess 178. Rivets 160, 165, 170 and 175 are non-limiting examples of rivets configured to engage with a system that drives the same in a friction plunge riveting process.

Figure 10A:
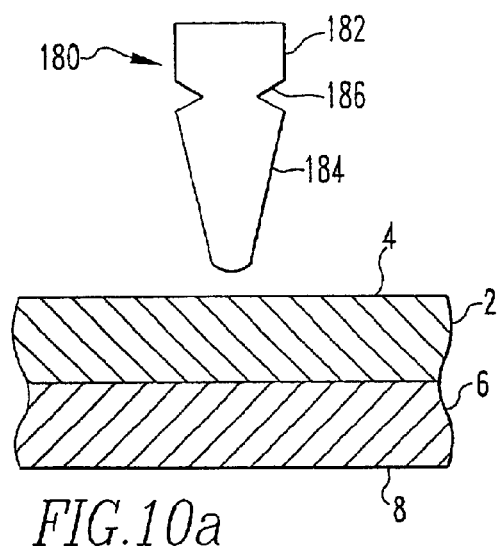
FIGS. 10a and 10b are cross-sectional views of pair of metal work pieces undergoing friction plunge riveting using a rivet with a break-away head.
Figure 10B:
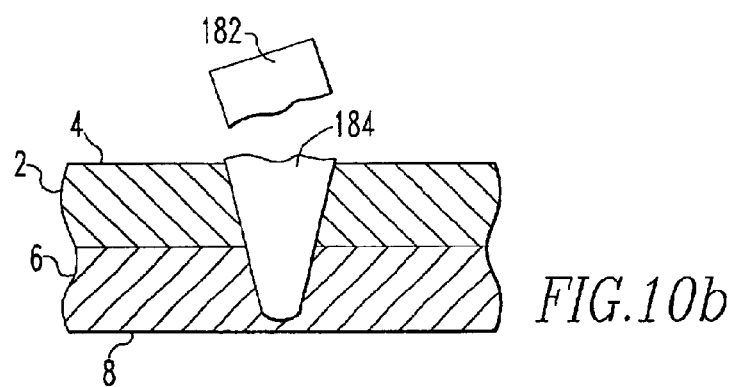
Figure 11:
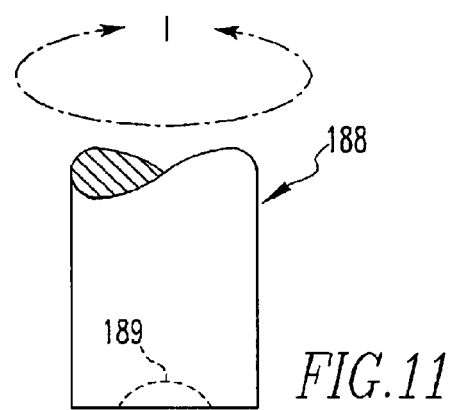
FIG. 11 is a finishing tool for use with the rivet shown in FIG. 10b.

In another embodiment of the invention shown in FIGS. 10a and 10b, rivet 180 includes a removable head 182 joined to a main body 184 via a thinned portion 186. Rivet 180 is plunged into the first and second components 2 and 6 as described above. However, when the joint is complete, head 182 removed, i.e. snapped off. In this manner, once the head 182 is removed from the rivet 180, the rivet 180 is substantially flush with the exposed surface 4 of the first component 2. For safety critical applications, the sheared surface of rivet main body 184 may be friction processed using a friction-forming tool 188 shown in FIG. 11. The cup-shaped rotary friction-forming tool 188 defines a recess 189 which receives the surface of the rivet main body 184 to eliminate or minimize micro-cracks associated with such sheared surfaces by rotating the tool in the directions of double arrow I. In addition, the friction-forming tool 188 can be used as a post-joining, rivet heading tool or as an alternative to localized machining of a joined rivet head.

Figure 12:
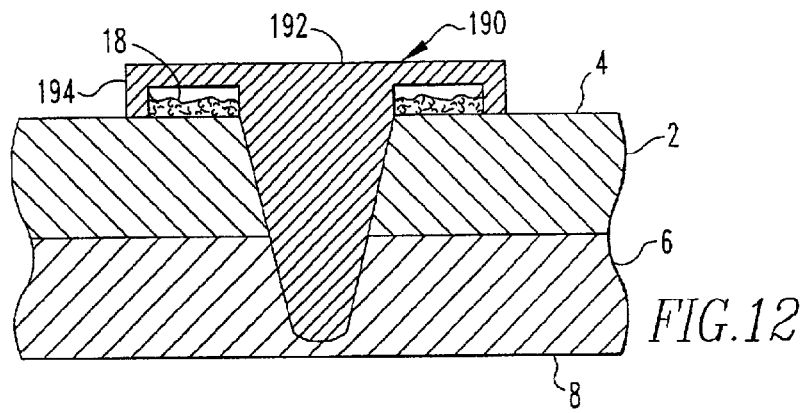
FIG. 12 is a cross-sectional view of a pair of metal work pieces friction plunge riveted with a rivet which hides flash.

In another embodiment shown in FIG. 12, the present invention includes a rivet 190 having an integrally formed flange 192 and annular lip 194. When friction plunge riveted into first and second components 2 and 6, flange 192 and lip 192 define a recess 196 into which flash 18 collects thereby hiding flash formed during the riveting process.

Figure 13A:
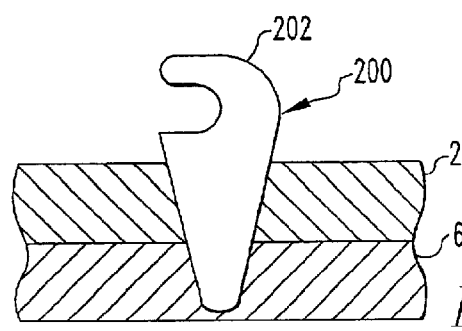
FIGS. 13a–13c are cross-sectional views of perspective views of metal work pieces friction plunge riveted with rivets having alternative heads.
Figure 13B:
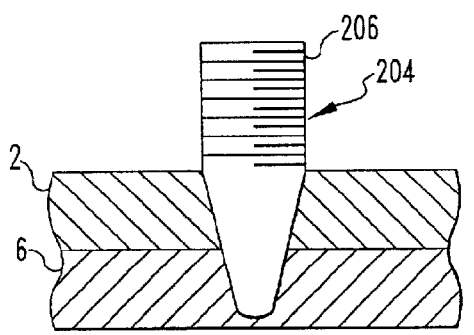
Figure 13C:
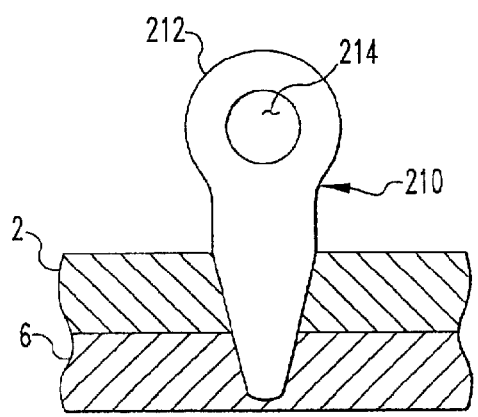

Alternatively, as shown in FIGS. 13a, 13b, and 13c, the heads of the rivets may include a portion for engaging with another component after joining. In FIG. 13a, rivet 200 includes a C-shaped portion 202. Rivet 204 in FIG. 13b has a threaded shank 206 to allow an internally threaded component to be threaded thereon. In FIG. 13c, rivet 210 includes an enlarged head 212 defining a bore 214.

For certain materials of the first and second components 2 and 6, optional preheating techniques may be employed including (1) heating the backing anvil 20 or 24 to preheat and preferentially soften the first and second components 2 and 6, (2) heating the backing anvil 20 or 24 and the clamp 22 to preheat and locally soften the first and second components 2 and 6, particularly for ferrous and certain non-ferrous materials through which induction through the thickness of the components 2 and 6 may occur, and (3) a diffused or rastered laser beam or other focused light source to preheat and condition the first and second components 2 and 6 immediately before the friction plunge riveting process. Such preheating techniques create a temporary preferential advantage in relative strengths, namely to soften the first and second components 2 and 6 such that rivet 10 behaves as a relatively harder material plunged into relatively softer material. When the friction plunge riveting process is used to join work pieces which are not the same but substantially similar, it is preferred that the rivet material is made of the harder of the two materials being joined. By controlling the overall surface interface between the rivet and the work pieces joined, it is possible to augment the intermixing and interlocking of the material between the rivet and the work pieces. The friction plunge riveting process of the present invention can be used to join hard materials to soft materials or hard materials to hard materials and soft materials to soft materials. In another embodiment of the invention, cryogenically cooled soft rivets can be plunged into the same grade of material or even harder materials that intermix themselves.

Figure 14:
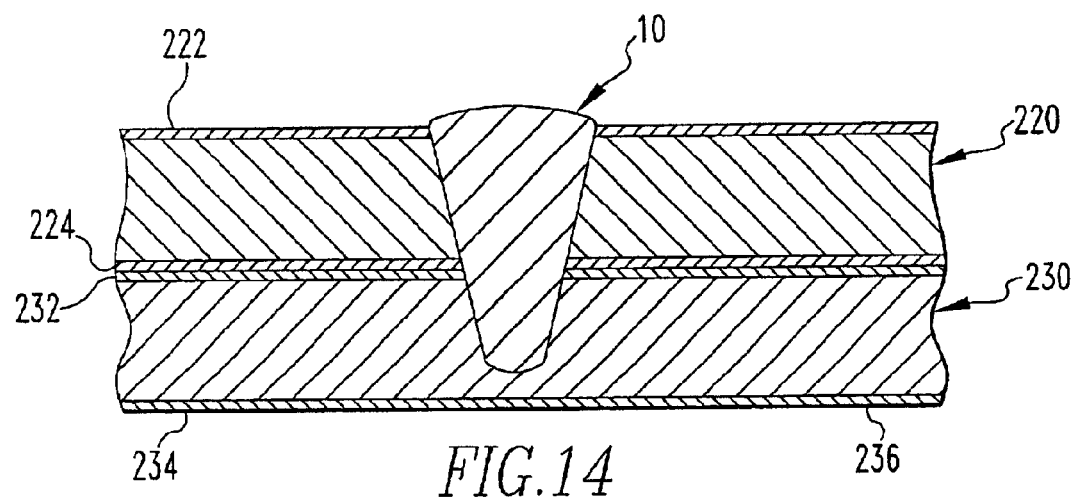
FIG. 14 is a cross-sectional view of a pair of clad metal work pieces friction plunge riveted according to the present invention.
Figure 15:
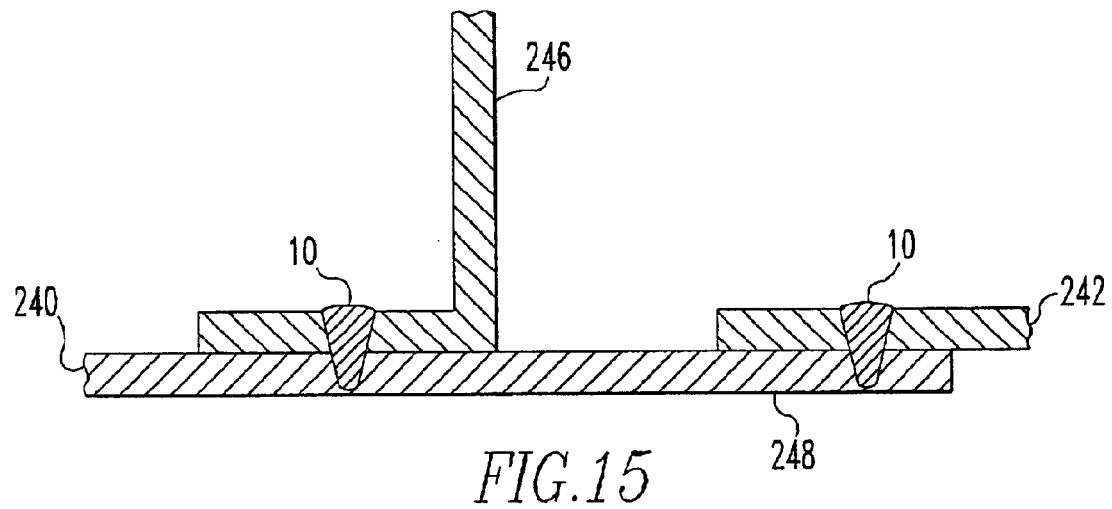
FIG. 15 is a cross-sectional view of a various work pieces friction plunge riveted together according to the present invention.

As discussed above, the may be used to join various materials as the first and second components 2 and 6. Referring to FIG. 14, the friction plunge riveting process of the present invention may be used to join a first clad component 220 having clad layers 222 and 224 to a second clad component 232 having clad layers 232 and 234. Clad components 220 and 230 may be plate or sheet product. For clad components having a corrosion resistant clad layer, such as layer 234, it is preferred that the rivet 10 does not extend through the second component 230. This arrangement is particularly suited for aircraft skin and marine transportation components. For example, the first or second components could be comprised of a 6013-T6 or 7075-T7X aluminum alloy covered with an 1100 aluminum alloy cladding. By maintaining exterior surface 236 of the second component 230 intact, components 220 and 230 are protected from environmental elements and are resistant to corrosion and other destructive interactions. For example, as shown in FIG. 15, aircraft skin component 240 can be friction plunge riveted to another aircraft skin component 242 and to aircraft stringer support component 246 without having the rivets 10 exposed to an exterior surface 248 of the aircraft. The skin components 240 and 242 may have the same or different thicknesses depending on the need of the particular assembly.

Figure 16A:
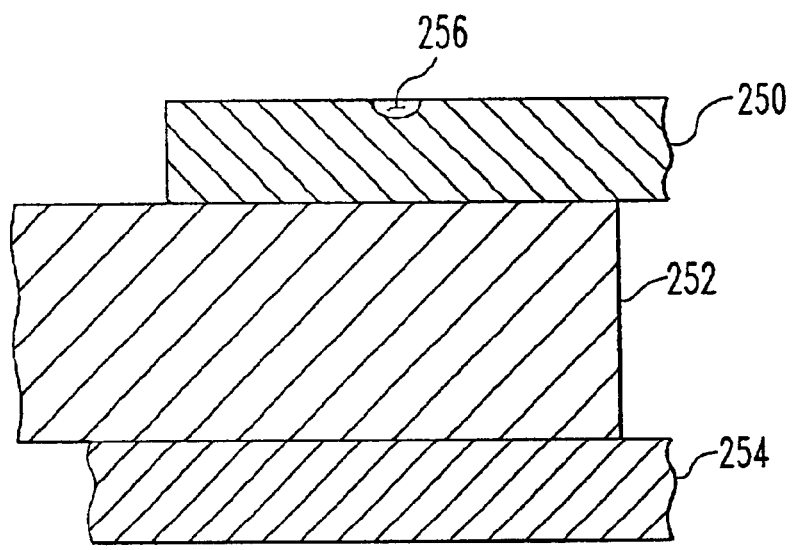
FIGS. 16a and 16b are cross-sectional views of three metal work pieces undergoing friction plunge riveting according to the present invention.
Figure 16B:
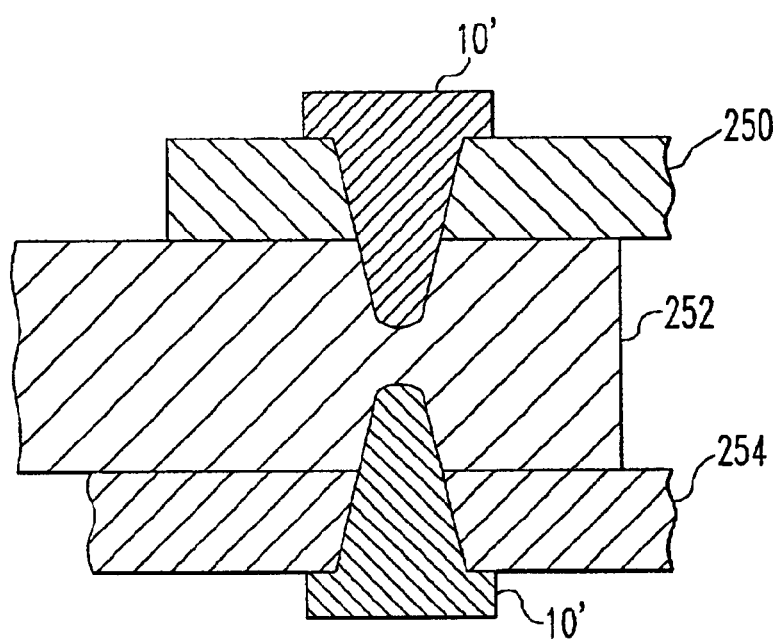

Referring to FIGS. 16a and 16b, a stack of more than two components may be friction plunge riveted together. Components 250, 252, and 254 may have the same or different metal compositions. It may be beneficial to predrill a pilot hole 256 in one component 250 as shown in FIG. 16a. The pilot hole 256 aides in accessing intermediate component 252 to affect a more rapid efficient joining of the components. Joints can be made one rivet at a time or simultaneously using a double-sided friction plunge riveting machine. With such a device, two friction welded rivets may be driven opposite each other as a means for joining more than two components together. Simultaneous double-sided riveting also provides a balance reactive torque when rotating rivets 10' on opposite sides of the stack of components 250, 252 and 254. Frictional heat is generated from either side of the stack. This increased amount of heat is conducted through the thickness of the components 250, 252 and 254 to further soften the components 250, 252 and 254 and aid penetration of the rivets 10'. As such, double-sided friction plunge riveting enables relatively thicker components to be joined together according to the present invention. Numerous components may be joined in this manner such as flexible bus bars, aircraft skins, and structural members.

The present invention provides significant advances in the art including the elimination of need for predrilled holes, as is required with blind riveting, yet produces sufficient frictional heat to function with smaller diameter, shorter length pilot holes in appropriate situations. Full metallurgical bonding occurs between the rivets and the components being joined. Due to the metallurgical bonding between the rivets and the components being joined, friction plunge riveting augments the structural performance of the joint as compared to other riveting processes, Sealants and/or adhesives at the faying surfaces between the components may be reduced or eliminated, and the fretting (i.e., contact damage from micro-slip between the work pieces and conventional rivet interface which leads to crack nucleation and fretting fatigue and fretting corrosion) and loosening of conventional riveted joints is eliminated.

Larger diameter friction welded rivets may be used and fewer rivets are required. The process of the present invention may be operated over a wide range of joining parameters (e.g., forging and welding force, rotation speeds) while yielding constant results including a sound metallurgical bond between the rivet and joined components. The present invention is also uniquely suited for joining components in restrictive environments, such as in a space station assembly or underwater.

In certain applications, the rivets may be manufactured or treated to provide a differential hardness by such means, including but not limited to, a) rapidly solidified high temperature materials, b) aluminum-magnesium-scandium and other metallurgy alloys that exhibit high strength at high heat, c) metal matrix composites, d) cold working during manufacture e.g., penning or cold drawn rivets strengthened with copper or copper alloys, e) cryogenic treatments, f) rivets manufactured from steel or certain other metals that produce retained phases rivets to complete the transformation into martensite prior to hardening and tempering, g) rivets treated for maximum hardness for heat treated aluminum alloys, and h) for certain materials, applying the rivet at sub-zero temperatures. In some applications, a momentary increase in hardness is desirable. For marine and chemical processing environments, corrosion resistance may be enhanced by riveting a hard alloy to a softer, pure aluminum. It is also possible to use a fully aged hardened rivet material, such as alloy AA7050-T7X into solution heat-treated and softened parts, such as AA alloy 7055-T4 before allowing the joints to naturally age for up to about 8 weeks. It is anticipated that the resulting joined product will exhibit the desired combination of both corrosion resistance and structural performance.

EXAMPLE

Two sheets of 2 mm thick aluminum alloy AA 6082-T6 (Vickers Hardness value of 113) were joined together with a cone-shaped rivet made of 2014-T6 aluminum (Vickers Hardness value of 162). The rivet had a 10 mm diameter flat tip and an included angle as shown in FIG. 3a.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method of joining a pair of metal components comprising the steps of:
   (a) placing a first metal component having a first exposed continuous surface and a second metal component having a second exposed surface in overlapping relationship to each other;
   (b) providing a metal rivet having a head and a pointed tip opposite the head for entering into the first and second components; and
   (c) rotating the rivet about its longitudinal axis and simultaneously plunging the rivet through the first component continuous surface and into the second component, wherein the hardness of the metal rivet is substantially similar to the hardness of at least one of the first and second components, such that the metal of the rivet and the first and second components plastically deform; and
   (d) solidifying the plasticized metal to produce a metallurgical bond between the rivet and each of the first and second components, wherein a final position of the rivet tip is within the second component and the rivet tip raises a portion of the second exposed surface.

2. The method of claim 1, wherein the raised portion has a semispherical configuration.

3. The method of claim 1, wherein the first and second components are held together between a clamp positioned on the first exposed surface and a backing anvil positioned against the second exposed surface, wherein the backing anvil defines a recess which receives the raised portion and deforms the raised portion into the configuration of the recess.

4. A method of joining a pair of metal components comprising the steps of:
   (a) placing a first metal component having a first exposed continuous surface and a second metal component having a second exposed surface in overlapping relationship to each other;
   (b) providing a metal rivet having a head and a pointed tip opposite the head for entering into the first and second components; and
   (c) rotating the rivet about its longitudinal axis and simultaneously plunging the rivet through the first component continuous surface and into the second component, wherein the hardness of the metal rivet is substantially similar to the hardness of at least one of the first and second components, such that the metal of the rivet and the first and second components plastically deform; and
   (d) solidifying the plasticized metal to produce a metallurgical bond between the rivet and each of the first and second components, and the first and second components are held together between a clamp positioned on the first exposed surface and a backing anvil positioned against the second component, wherein the backing anvil has a substantially planar surface against which the rivet abuts to maintain the rivet tip flush with the second exposed surface.

5. A method of joining a pair of metal components comprising the steps of:
   (a) placing a first metal component having a first exposed continuous surface and a second metal component having a second exposed surface in overlapping relationship to each other;
   (b) providing a metal rivet having a head and a pointed tip opposite the head for entering into the first and second components; and
   (c) rotating the rivet about its longitudinal axis and simultaneously plunging the rivet through the first component continuous surface and into the second component, wherein the hardness of the metal rivet is substantially similar to the hardness of at least one of the first and second components, such that the metal of the rivet and the first and second components plastically deform; and
   (d) solidifying the plasticized metal to produce a metallurgical bond between the rivet and each of the first and second components, wherein at least one of the first and second components is preheated prior to plunging the rivet therein.

6. A method of joining a pair of metal components comprising the steps of:
   (a) placing a first metal component having a first exposed continuous surface and a second metal component having a second exposed surface in overlapping relationship to each other;

(b) providing a metal rivet having a head and a pointed tip opposite the head for entering into the first and second components; and (c) rotating the rivet about its longitudinal axis and simultaneously plunging the rivet through the first component continuous surface and into the second component, wherein the hardness of the metal rivet is substantially similar to the hardness of at least one of the first and second components, such that the metal of the rivet and the first and second components plastically deform; and (d) solidifying the plasticized metal to produce a metallurgical bond between the rivet and each of the first and second components, further comprising joining a third metal component to the second component by the steps of:

(i) positioning the third component having a third exposed surface in overlapping relationship to the second exposed surface;

(ii) providing another metal rivet having a head and a tip opposite the head for entering into the third and second components; and (iii) rotating the other rivet about its longitudinal axis and simultaneously plunging the other rivet through the third component exposed surface and into the second component, wherein the hardness of the other metal rivet is substantially similar to the hardness of one of the third and second components, wherein the third exposed surface defines a pilot hole into which the other rivet is positioned prior to step (iii).

7. A method of joining a pair of metal components comprising the steps of:

(a) placing a first metal component having a first exposed continuous surface and a second metal component having a second exposed surface in overlapping relationship to each other;

(b) providing a metal rivet having a head and a pointed tip opposite the head for entering into the first and second components; and (c) rotating the rivet about its longitudinal axis and simultaneously plunging the rivet through the first component continuous surface and into the second component, wherein the hardness of the metal rivet is substantially similar to the hardness of at least one of the first and second components, such that the metal of the rivet and the first and second components plastically deform; and (d) solidifying the plasticized metal to produce a metallurgical bond between the rivet and each of the first and second components and (e) removing the rivet head following step (d).

8. The method of claim 7, wherein the rivet head is joined to a main portion of the rivet via a narrowed portion such that when the plasticized metal solidifies, the rivet head breaks off at the narrowed portion from the rivet main portion.

9. A system for joining a first metal component to a second metal component with a rivet, wherein the hardness of the rivet is substantially similar to the hardness of at least one of the first and second components, said system comprising:

a clamp positioned on a continuous first exposed surface of the first component for maintaining the first component adjacent the second component;

a backing anvil for supporting a second exposed surface of the second component adjacent the first component;

means for rotating and plunging the rivet through the continuous first exposed surface and into the second component to produce a region of plasticized metal between the rivet and each of the first and second components, the plasticized metal being solidifiable to form a metallurgical bond between the rivet and each of the first and second components; and means for removing flash produced when the rivet is friction welded to the first and second components.

10. The system of claim 9, wherein said means for removing flash comprises a moveable member linked to said means for rotating, said moveable member configured to move about the rivet to remove the flash.

11. The system of claim 10, wherein said rotating means is disengagable from the rivet to allow the friction weld to solidify while said moveable member continues to move about the rivet.

* * * * *